US011050679B1

(12) United States Patent
Przygienda et al.

(10) Patent No.: US 11,050,679 B1
(45) Date of Patent: Jun. 29, 2021

(54) DEFINING NON-FORWARDING ADJACENCIES IN BIPARTITE NETWORKS, SUCH AS CLOS NEWTORKS, HAVING A LEVEL 2 BACKBONE AND LEVEL 1 NODES

(71) Applicant: Juniper Networks, Inc., Sunnyvale, CA (US)

(72) Inventors: Antoni B. Przygienda, Sunnyvale, CA (US); Russ White, Apex, NC (US)

(73) Assignee: Juniper Networks, Inc., Sunnyvale, CA (US)

(*) Notice: Subject to any disclaimer, the term of this patent is extended or adjusted under 35 U.S.C. 154(b) by 181 days.

(21) Appl. No.: 16/457,592

(22) Filed: Jun. 28, 2019

(51) Int. Cl.
*H04L 12/933* (2013.01)
*H04L 12/753* (2013.01)

(52) U.S. Cl.
CPC .......... *H04L 49/1515* (2013.01); *H04L 45/48* (2013.01)

(58) Field of Classification Search
CPC ............................ H04L 49/1515; H04L 45/48
See application file for complete search history.

(56) References Cited

U.S. PATENT DOCUMENTS

| 7,535,914 | B2* | 5/2009 | Mudhar | H04L 12/185 370/392 |
| 7,792,987 | B1* | 9/2010 | Vohra | H04L 45/02 709/238 |
| 8,259,713 | B2* | 9/2012 | Lawrence | H04L 45/24 370/388 |
| 8,848,509 | B2* | 9/2014 | Allan | H04L 45/48 370/216 |
| 8,953,432 | B2* | 2/2015 | Ansari | H04L 45/02 370/216 |
| 9,647,959 | B2* | 5/2017 | Hao | H04L 61/2069 |
| 9,660,897 | B1* | 5/2017 | Gredler | H04L 45/50 |
| 9,838,246 | B1* | 12/2017 | Hegde | H04L 41/0816 |

(Continued)

OTHER PUBLICATIONS

Patel et al., "L1/L2 Optimal IS-IS Routing," draft-ietf-isis-l112-00.txt (Internet Engineering Task Force, Feb. 15, 1999).

(Continued)

*Primary Examiner* — Ivan O Latorre
(74) *Attorney, Agent, or Firm* — John C. Pokotylo; Pokotylo Patent Services

(57) ABSTRACT

Problems associated with providing a large Clos network having at least one top of fabric (ToF) node, a plurality of internal nodes, and a plurality of leaf nodes may be solved by: (a) providing L2 tunnels between each of the leaf nodes of the Clos and one or more of the at least one ToF node to ensure a non-partitioned IGP L2 backbone, and (b) identifying the L2 tunnels as non-forwarding adjacencies in link state topology information stored in ToF node(s) and leaf node(s) such that the L2 tunnels are not used for forwarding traffic. In some example implementations consistent with the present disclosure, the L2 tunnels are not used to compute routes from the link state topology information. Alternatively, in some other example implementations consistent with the present disclosure, the L2 tunnels are used to compute routes, but such routes are not used, or only used if no routes using only L1 (or L1-down adjacencies) are available. In some example implementations consistent with the present disclosure, L2 prefix information is leaked down to L1 of the IGP.

20 Claims, 14 Drawing Sheets

(56) References Cited

U.S. PATENT DOCUMENTS

| | | | |
|---|---|---|---|
| 9,954,765 B2* | 4/2018 | Allan | H04L 45/12 |
| 10,044,605 B2* | 8/2018 | Przygienda | H04L 45/26 |
| 10,050,876 B2* | 8/2018 | Kapadia | H04L 45/64 |
| 10,218,629 B1* | 2/2019 | An | H04L 45/22 |
| 10,673,742 B2* | 6/2020 | Allan | H04L 51/24 |
| 2006/0092976 A1* | 5/2006 | Lakshman | H04L 45/60 |
| | | | 370/469 |
| 2006/0291446 A1* | 12/2006 | Caldwell | H04L 45/42 |
| | | | 370/351 |
| 2011/0110370 A1* | 5/2011 | Moreno | H04L 45/04 |
| | | | 370/392 |
| 2012/0075988 A1* | 3/2012 | Lu | H04L 41/0654 |
| | | | 370/218 |
| 2013/0208624 A1* | 8/2013 | Ashwood-Smith | H04L 45/12 |
| | | | 370/255 |
| 2014/0376402 A1* | 12/2014 | Dutt | H04L 41/0843 |
| | | | 370/254 |
| 2015/0003283 A1* | 1/2015 | Previdi | H04L 45/64 |
| | | | 370/254 |
| 2017/0201451 A1* | 7/2017 | Allan | H04L 45/12 |
| 2018/0152378 A1* | 5/2018 | Fan | H04L 61/6022 |
| 2018/0183706 A1* | 6/2018 | Przygienda | H04L 45/32 |
| 2018/0262446 A1* | 9/2018 | Zuo | H04L 63/02 |
| 2018/0324090 A1* | 11/2018 | Duncan | H04L 12/4641 |
| 2019/0273678 A1* | 9/2019 | Peng | H04L 45/12 |
| 2019/0363975 A1* | 11/2019 | Djernaes | H04L 45/24 |
| 2020/0007382 A1* | 1/2020 | Xu | H04L 41/0654 |
| 2021/0021507 A1* | 1/2021 | Eckert | H04L 45/34 |

OTHER PUBLICATIONS

Li et al., "Domain-wide Prefix Distribution with Two-Level IS-IS," Request for Comments 2966 (Internet Engineering Task Force, Oct. 2000).

Chen et al., "OSPF Topology-Transparent Zone," Request for Comments 8099 (Internet Engineering Task Force, Feb. 2017).

Li, "Level 1 Area Abstraction for IS-IS," draft-li-area-abstraction-00 (Internet Engineering Task Force, Jun. 28, 2018).

* cited by examiner

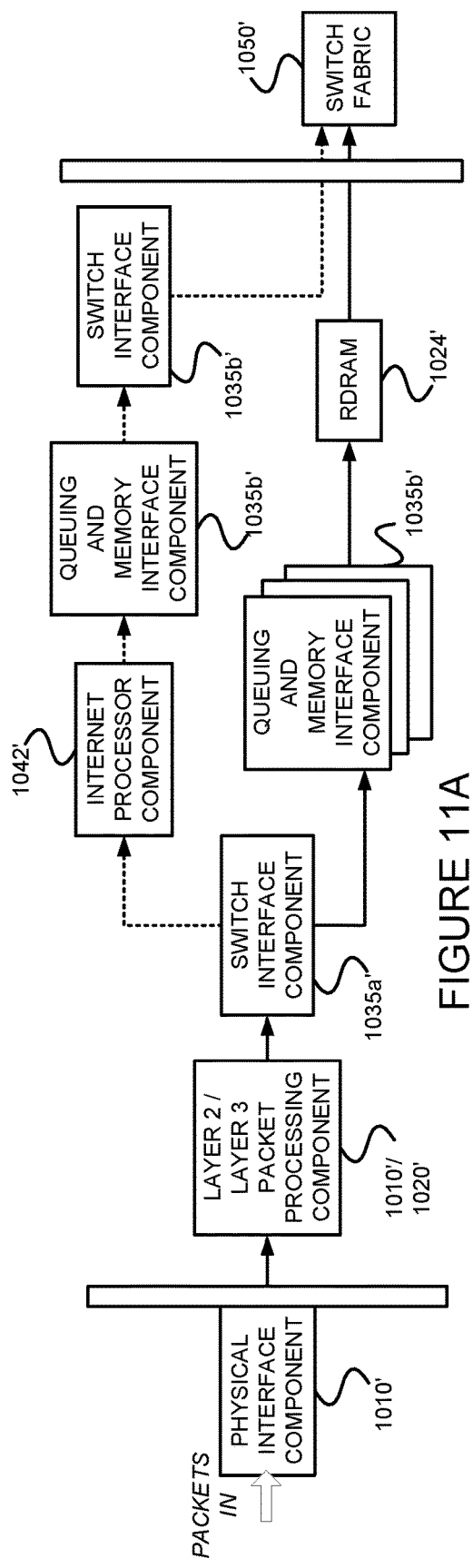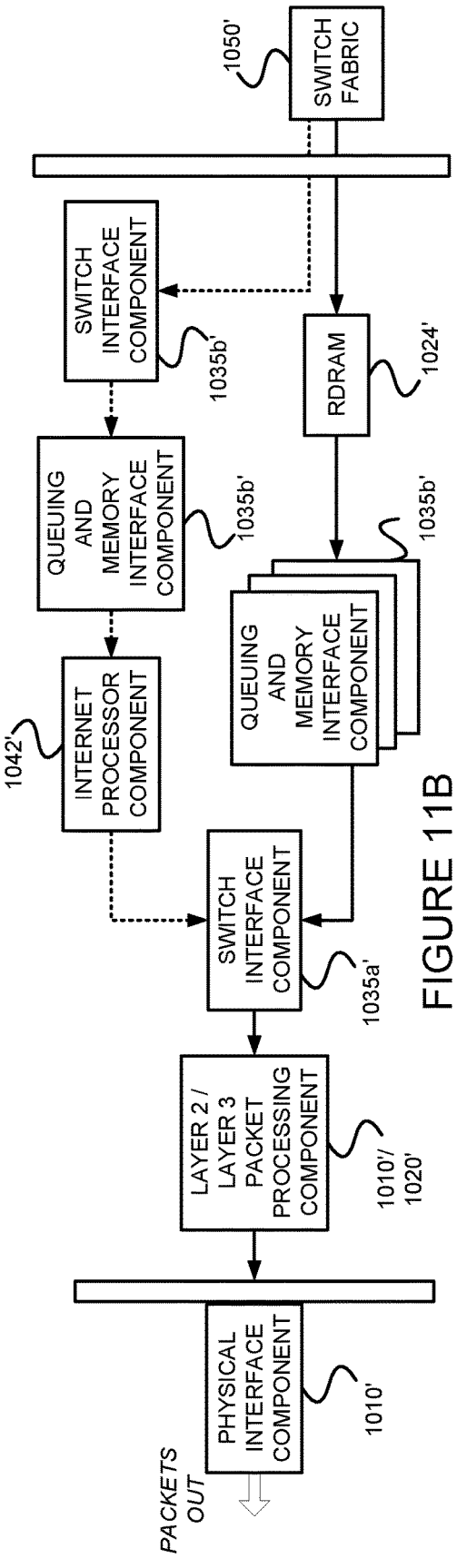

DEFINING NON-FORWARDING ADJACENCIES IN BIPARTITE NETWORKS, SUCH AS CLOS NEWTORKS, HAVING A LEVEL 2 BACKBONE AND LEVEL 1 NODES

§ 1. BACKGROUND OF THE INVENTION

§ 1.1 Field of the Invention

The present disclosure concerns networks, such as networks having a Clos topology (referred to as "Clos networks"). More specifically, the present disclosure concerns enabling and/or improving the use of a hierarchical (e.g., two level) interior gateway protocol ("IGP") in a Clos network.

§ 1.2 Background Information

The trend towards using a leaf and spine (e.g., Clos) network topology, such as in data center networks for example, is described in this section.

§ 1.2.1 Clos Topologies in Data Centers

As shown in FIG. 1, in a conventional data center network architecture 100, servers 110a-110d can communicate with one another via nodes (e.g., routers, switches, etc.) 122 in an "access" or "top-of-rack" (TOR) layer 120, nodes 132 in a "distribution" layer 130, and nodes 142 in a "core" layer 140. The three layers 120, 130, 140 are connected to each other via layer 2 (in the sense of the Open Systems Interconnect (OSI) seven-layer model) links. Thus, traffic flow within the network 100 is controlled mostly by L2 protocols, such as the spanning tree protocol (STP) for example.

Unfortunately, there are a number of drawbacks of this traditional network architecture 100 which make it unsuitable for many current data centers. Such drawbacks include inconsistent latency (due to different numbers of hops between source and destination servers), limitations on scalability and limitations of the spanning tree protocol (STP).

FIG. 2 illustrates the use of a Clos network topology to interconnect servers 210 in a data center environment 200. The Clos network includes a spine (also referred to as a Top of Fabric, or "ToF") layer 230 and a leaf (also referred to as a Top of Rack or "ToR") layer 220. The servers 210a-210h are connected to leaf nodes (e.g., switches, routers, etc.) 222a-222d, and each leaf node 222a-22d is connected to all spine nodes 232a-232d. There are no direct leaf-to-leaf, or spine-to-spine connections.

The Clos network topology has a number of advantages. First, each server is three hops away from any of the other servers in a three-stage Clos topology. No matter how many stages there are, total hop count will be the same between any two servers. Thus, consistent latency can be maintained throughout the data center. Second, Multi-Chassis Link Aggregation Group (MLAG or MCLAG) is available on the server side. That is, any of the servers 210a-210h can be connected to two (or more) different leaf or TOR nodes 222 in order to have redundancy and/or load balancing capability. Third, the Clos topology scales horizontally, which is very cost effective. The bandwidth capacity between servers 210a-201h can be increased by adding more spine-leaf links, as well as adding more spine nodes 232. As newly added spine nodes 232 will be connected to each leaf node 222, server-to-server bandwidth/throughput will increase significantly. This attribute makes Clos network topologies more cost effective than the traditional data center network topology because spine nodes do not have to be big and expensive (as opposed to the core nodes 142 in FIG. 1, which do have to be big and expensive) when scaling in the traditional design.

Although Clos networks have been introduced in the context of data centers, the Clos topology is attractive for other uses as well.

§ 1.2.2 Two Level Interior Gateway Protocols (IGPs) in Clos Networks

Referring, to FIG. 3, some service providers are using Clos networks 300 in a manner that can be thought of as a exploded router chassis, in which leaf nodes 312 of layer 310 can be thought of as "line cards" of the exploded router chassis, while the internal nodes 322 of layer 320 and ToF nodes 332 of layer 330 can be thought of as the "switch fabric" of the exploded router chassis. (Note that although only one layer 320 of internal nodes 322 is shown, there can be multiple layers of internal nodes.) The nodes 312/322/332 of such a Clos network 300 can be inexpensive routers (such as the PTX router from Juniper Networks, Inc. of Sunnyvale, Calif., referred to as "bricks"). At least one service provider is deploying a novel type of backbone using level 2 of the Intermediate System-Intermediate System ("IS-IS") interior gateway protocol ("IGP") running on top of Clos fabrics. This type of architecture is confronting a number of challenges.

First, networks expand as business grows and traffic increases. For scalability and manageability, a hierarchical network architecture is used to regroup routers into areas. This is because link-state protocols such as IS-IS do not scale well if an autonomous system ("AS") includes a single set of routing devices that all share a common database to compute the best paths through the AS. Because the shortest-path-first (SPF) algorithm, which is used to find routes in such networks, works in an exponential fashion, the computational demand can become too heavy when too many routing devices share their complete routing information with each other. To alleviate this issue, large ASs are divided into smaller parts (e.g., flooding domains) called areas. However, when an AS is split into areas, the disjointed areas must be connected to route traffic between the areas. Reachability information at the area borders must be injected into each other areas.

In IS-IS, routing between areas is organized hierarchically. This organization is accomplished by configuring "Level 1" (or "L1") and "Level 2" (or "L2") intermediate systems. L1 systems route within an area. When the destination is outside an area, L1 systems route toward a L2 system. L2 intermediate systems route between areas and toward other ASs. No IS-IS area functions strictly as a backbone.

L1 routers share intra-area routing information, while L2 routers share inter-area information about IP addresses available within each area. IS-IS routers can act as both L1 and L2 (or "L1L2") routers, sharing intra-area routes with other L1 routers and inter-area routes with other L2 routers.

The propagation of link-state updates is determined by the level boundaries. All routers within a level maintain a complete link-state database of all other routers in the same area (e.g., flooding domain). Each router then uses the Dijkstra algorithm to determine the shortest path from the local router to other routers in the link-state database.

As should be appreciated from the foregoing, hierarchical levels (and separated L1 areas) help to avoid scalability problems that would otherwise occur if all routers were configured as L2 routers.

If, however, Clos networks are abstracted as L1, one simple way to achieve L2 backbone connectivity is to insert all Clos nodes into L2. Unfortunately, however, this sacrifices the benefits of hierarchical levels and separated areas. Referring to FIG. 4, consider Clos networks 490a and 490c, the first Clos network 490a with leaf nodes A, B, C, D, . . . in layer 310a and the other Clos network with leaf nodes 1, 2, 3, 4, . . . in layer 310c. If all nodes in these Clos networks (including nodes in intermediate and ToF layers, not shown) 490a and 490c are fully exposed in L2 to ensure connectivity (i.e., to avoid partitioning) of the L2 backbone, scalability is a problem. If, on the other hand, the service provider tries to "hide" the non-leaf nodes (e.g., the internal nodes, including the ToF nodes, of each Clos network), the L2 backbone becomes partitioned, which is not permitted. In summary, on the one hand, if all nodes are L2 nodes, scalability becomes a limitation, but on the other hand, if internal nodes (including the ToF nodes) of the Clos are configured as L1 only nodes, the L2 backbone is partitioned, which is not permitted.

The document, "OSPF Topology-Transparent Zone," *Request for Comments* 8099 (Internet Engineering Task Force, February 2017) (referred to as "RFC 8099 and incorporated herein by reference), proposes connecting all the leaf nodes using a full mesh of L2 adjacencies (e.g., L2 tunnels); internal nodes are L1. The proposed solution in RFC 8099 has relatively poor scaling properties due to the $N^2$ requirement on the L2 tunnels. Furthermore, the use of L2 tunnels for forwarding imposes the need for encapsulation and decapsulation on all of the leaf nodes. Due to the extra computation required for encapsulation and decapsulation, it would be useful to avoid or at least minimize the need for encapsulation and decapsulation.

The document, "Level 1 Area Abstraction for IS-IS," *draft-li-area-abstraction*-00 (Internet Engineering Task Force, Jun. 28, 2018) (referred to as "Li area abstraction" and incorporated herein by reference) discusses extensions to the IS-IS routing protocol that would allow level 1 areas to provide transit, yet only inject an abstraction of the topology into level 2. The Li area abstraction document notes that for Level 2 SPF computations to work correctly, the transit topology must also appear in the Level 2 link state database. This implies that all routers that could possibly provide transit, plus any links that might also provide Level 2 transit must also become part of the Level 2 topology.

The Li area abstraction document notes that ensuring that the transit topology appears in the Level 2 link state database is not onerous if this is a relatively tiny portion of the Level 1 area, but doing so becomes problematic with certain data center topologies (e.g., a Layer 3 Leaf-Spine (L3LS) topology, which is a 3-stage Clos fabric). The Li area abstraction document notes that in such a topology, the desire is to use Level 1 to contain the routing of the entire L3LS topology and then to use Level 2 for the remainder of the network. Leaf nodes in the L3LS topology are appropriate for connection outside of the data center itself, so they would provide connectivity for Level 2. If there are multiple connections to Level 2 for redundancy, or to other areas, these too would also be made to the leaf nodes in the topology. This creates a difficulty because there are now multiple Level 2 leaf nodes in the topology, with connectivity between the leaf nodes provide by the spines. In accordance with IS-IS, all spine routers would necessarily be part of the Level 2 topology, plus all links between a Level 2 leaf and the spines. In the limit, where all leaves need to support Level 2, it implies that the entire L3LS topology becomes part of Level 2. The Li area abstraction document notes that this is seriously problematic as it more than doubles the link state database held in the L3LS topology and eliminates any benefits of the hierarchy.

The Li area abstraction document proposes to completely abstract away the Level 2 topology of the Level 1 area, making the entire area look like a single system directly connected to all of the area's L2 neighbors. By only providing an abstraction of the topology, L2's requirement for connectivity can be satisfied without the full overhead of the area's internal topology. It then becomes the responsibility of the L1 area to ensure the forwarding connectivity that's advertised. The Li area abstraction document proposes to implement Area Abstraction by having a Level 2 pseudo-node that represents the entire Level 1 area. This is the only LSP from the area that will be injected into the overall Level 2 link state database.

Unfortunately, it is believed that the solution proposed in the Li area abstraction document will be largely infeasible due to a single point of failure, and difficulties handling multicast and broadcast. The present inventors believe that providing a redundancy in the context of the solution proposed in the Li area abstraction document would be highly complex (similar to non-stop routing ("NSR") complexities caused by multiple routing engines, which is one of the reasons Clos network topologies are being used as an alternative to data centers having router chassis with multiple routing engines). That is, as understood by the present inventors, the solution in the Li area abstraction document can be thought of as a chassis with a single routing engine.

As should be appreciated from the foregoing, it would be useful to be able to provision large Clos networks in a manner that preferably (1) is scalable, (2) ensures L2 backbone connectivity, (3) avoids or minimizes the use of L2 tunnels for forwarding traffic, and (4) considers otherwise hidden network topology information when computing routes.

§ 2. SUMMARY OF THE INVENTION

Problems associated with providing a large Clos network having at least one top of fabric (ToF) node, a plurality of internal nodes, and a plurality of leaf nodes may be solved by: (a) providing L2 tunnels between each of the leaf nodes of the Clos and one or more of the at least one ToF node to ensure a non-partitioned IGP L2 backbone, and (b) identifying the L2 tunnels as non-forwarding adjacencies in link state topology information stored in ToF node(s) and leaf node(s) such that the L2 tunnels are not used for forwarding traffic.

In some example implementations consistent with the present disclosure, the L2 tunnels are not used to compute routes from the link state topology information. Alternatively, in some other example implementations consistent with the present disclosure, the L2 tunnels are used to compute routes, but such routes are not used, or only used if no routes using only L1 (or L1-down adjacencies) are available.

In some example implementations consistent with the present disclosure, L2 prefix information is leaked down to L1 of the IGP.

§ 3. BRIEF DESCRIPTION OF THE DRAWINGS

Figure 1:
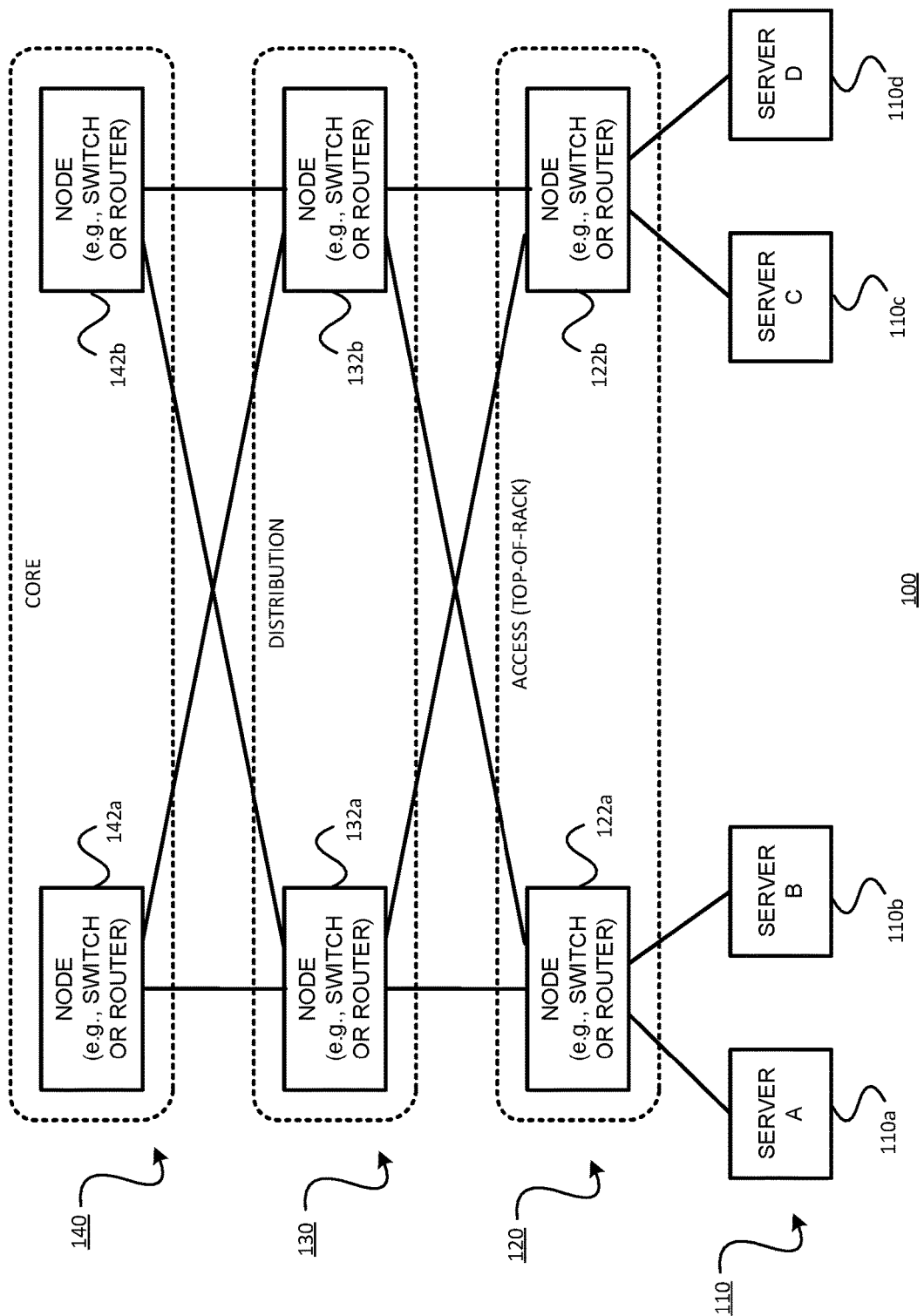
FIG. 1 illustrates a conventional data center network topology.
Figure 2:
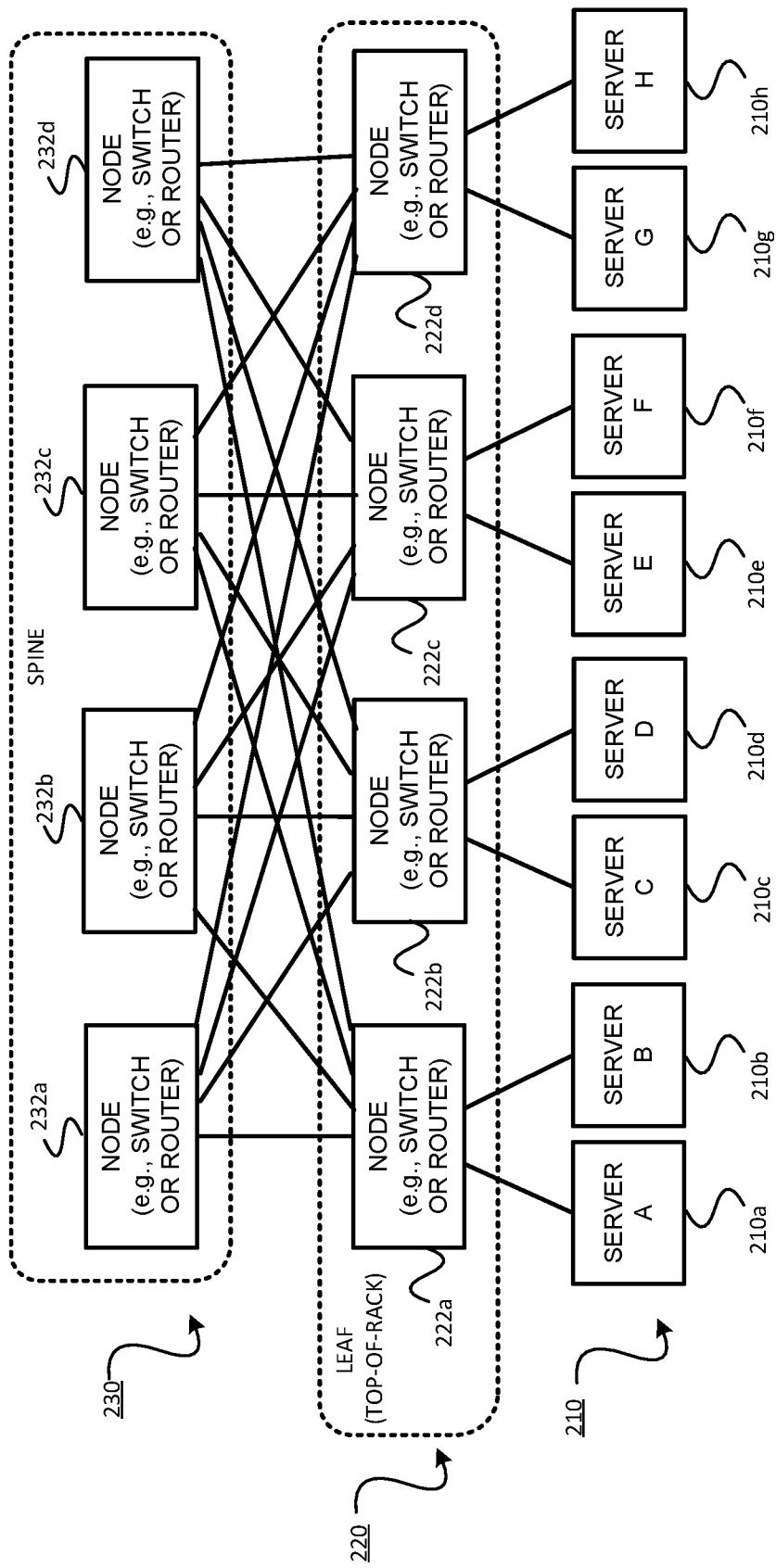
FIG. 2 illustrates a Clos network interconnecting servers in a data center environment.
Figure 3:
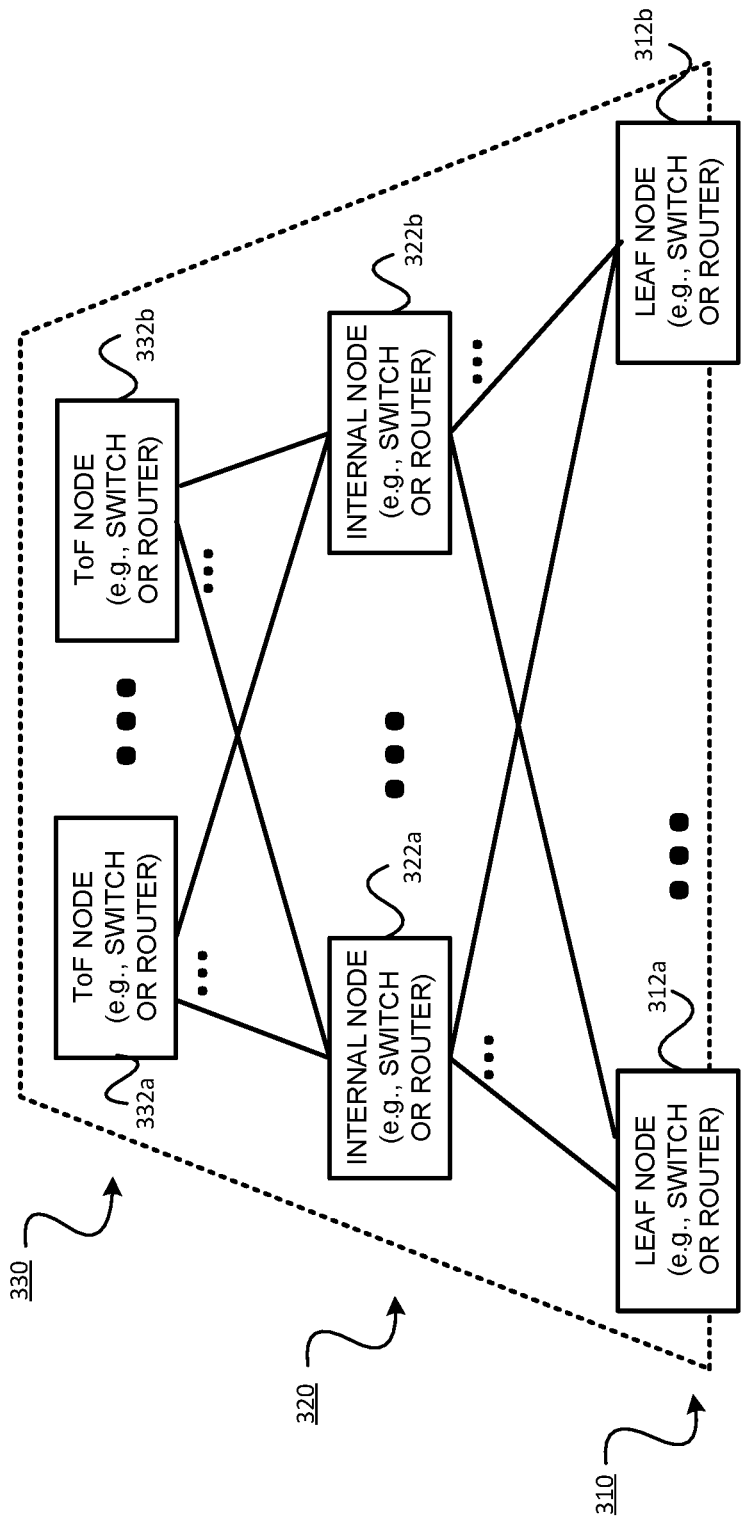
FIG. 3 illustrates terminology used to describe various nodes used in a Clos network.
Figure 4:
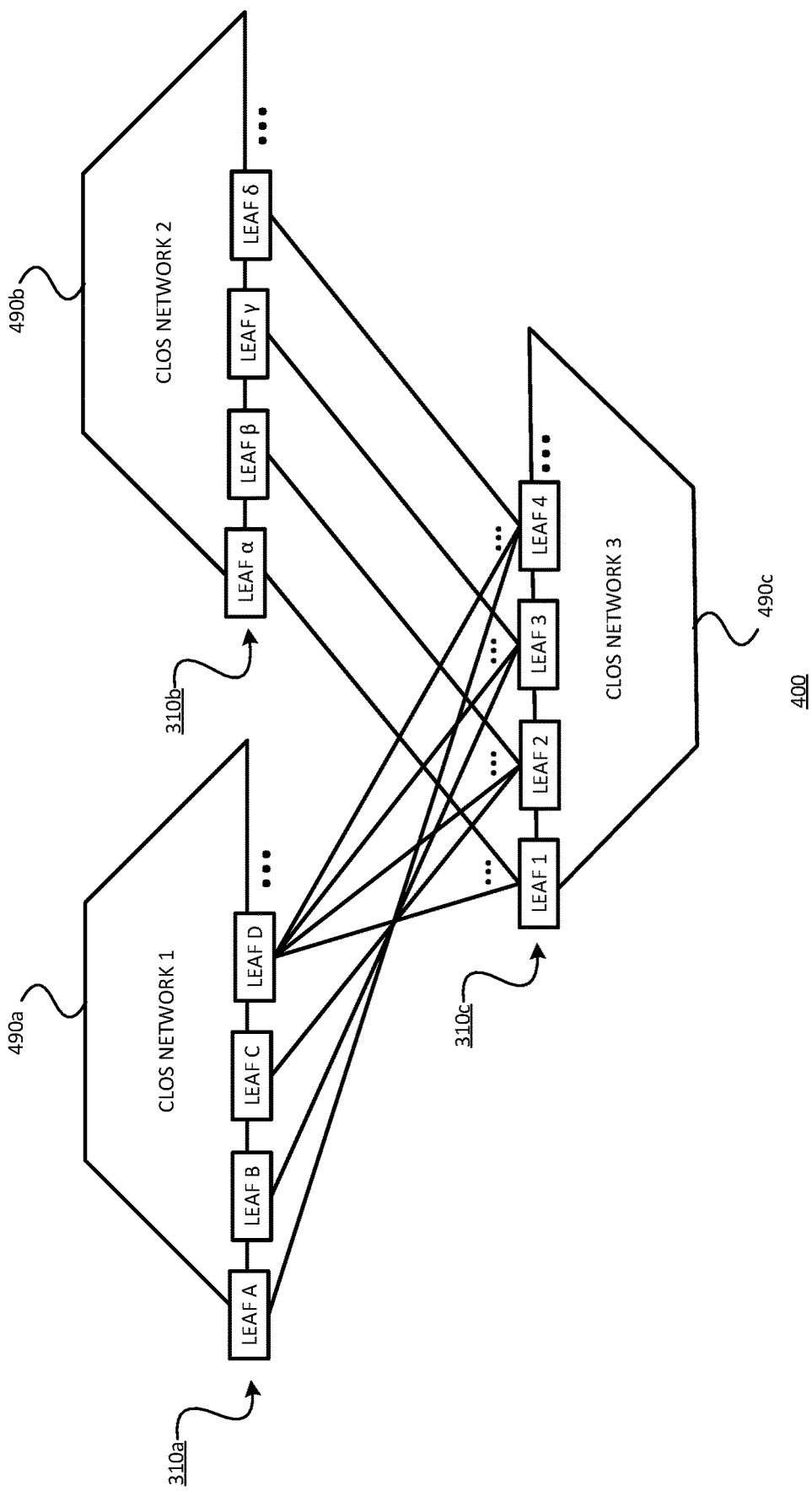
FIG. 4 illustrates an example environment, including more than one Clos network, in which the example embodiments consistent with the present description may be used.
Figure 6A:
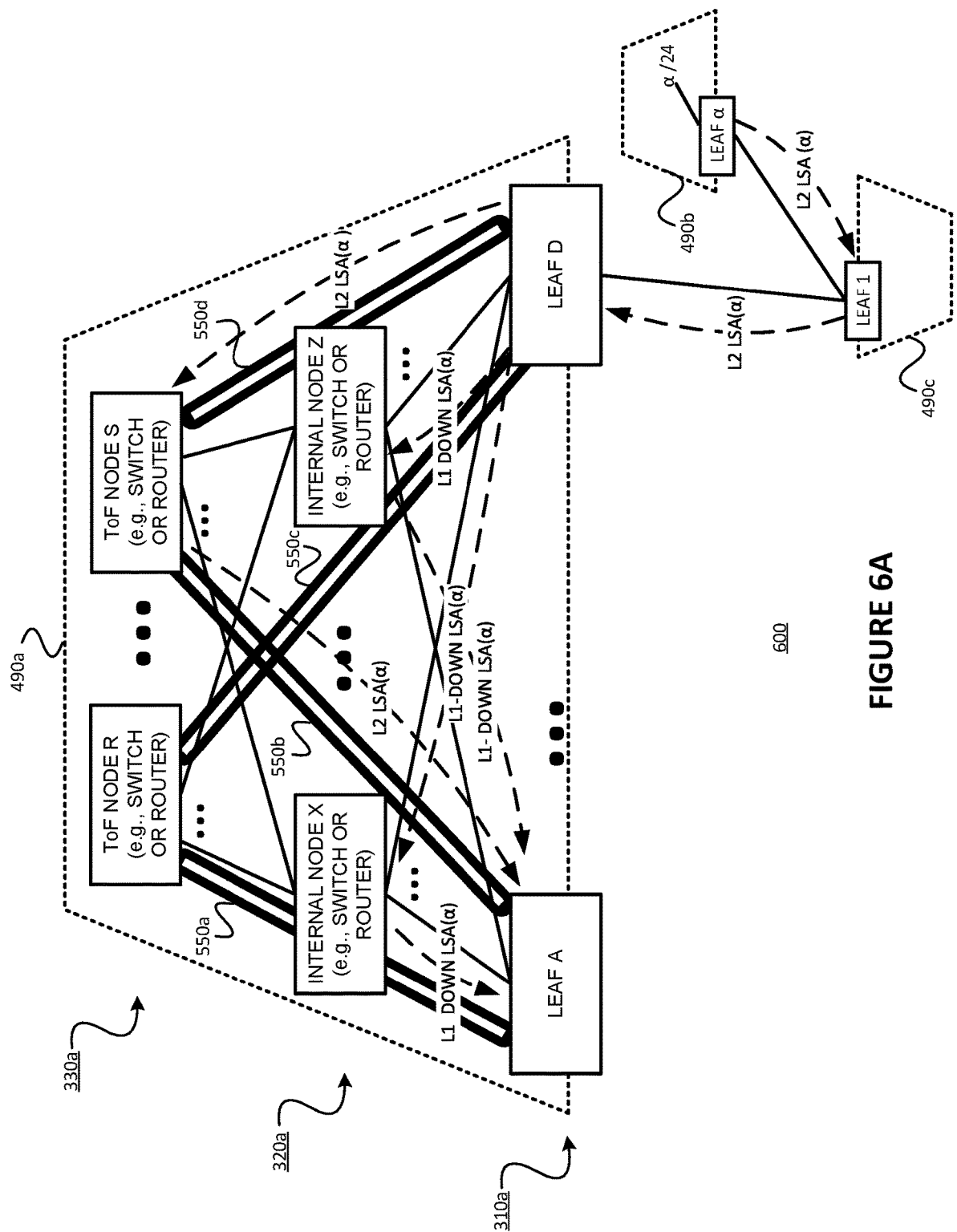
Figure 6B:
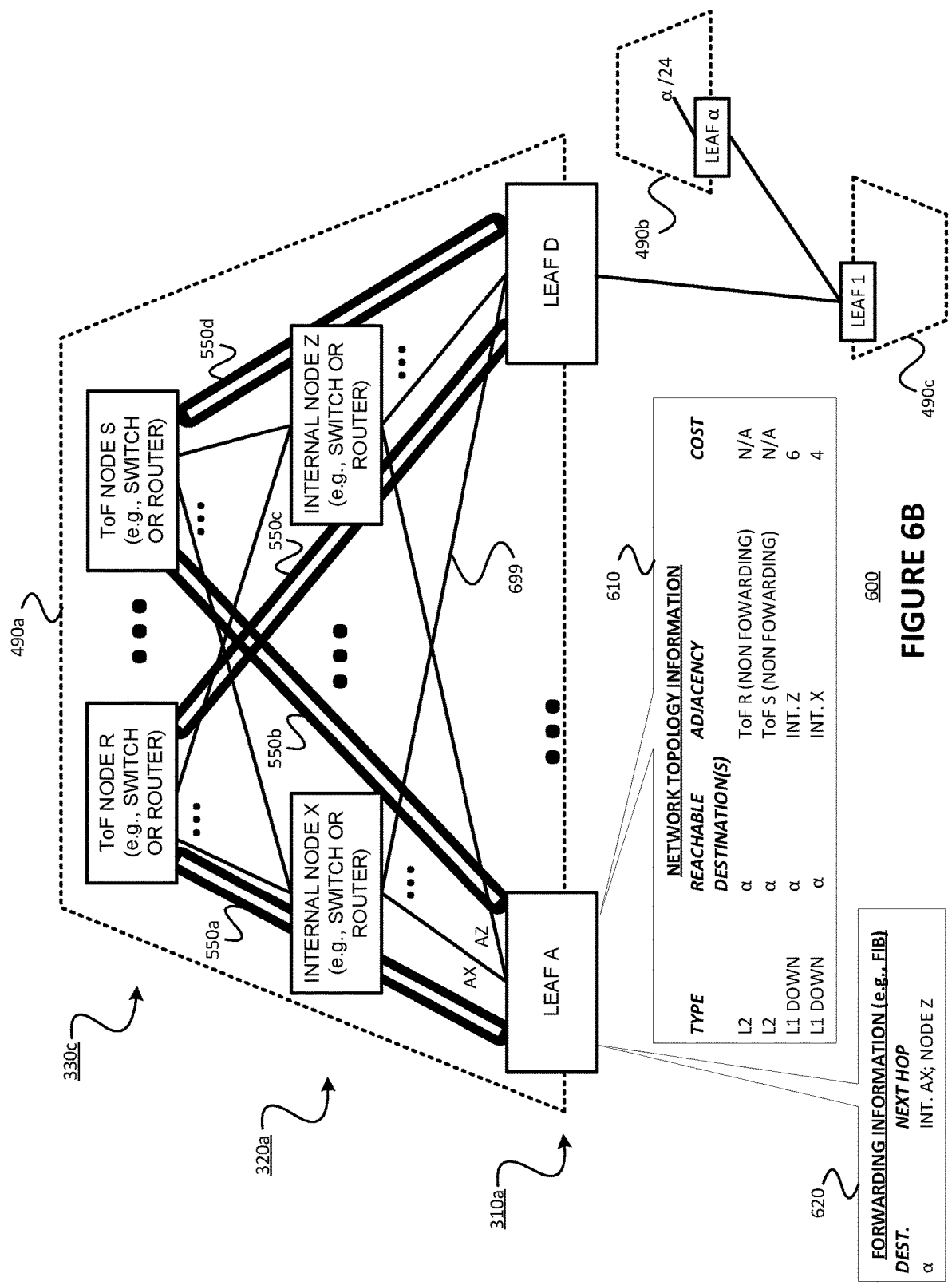

FIG. 6A illustrates the use of L2 link state advertisements (LSAs), and leaking from L2 to L1, consistent with the present description, to propagate prefix information in the example environment of FIG. 4. FIG. 6B illustrates example network topology information and forwarding information stored in leaf node A, consistent with the present description, based on prefix information learned from L2 LSAs and L-down LSAs.

Figure 7:
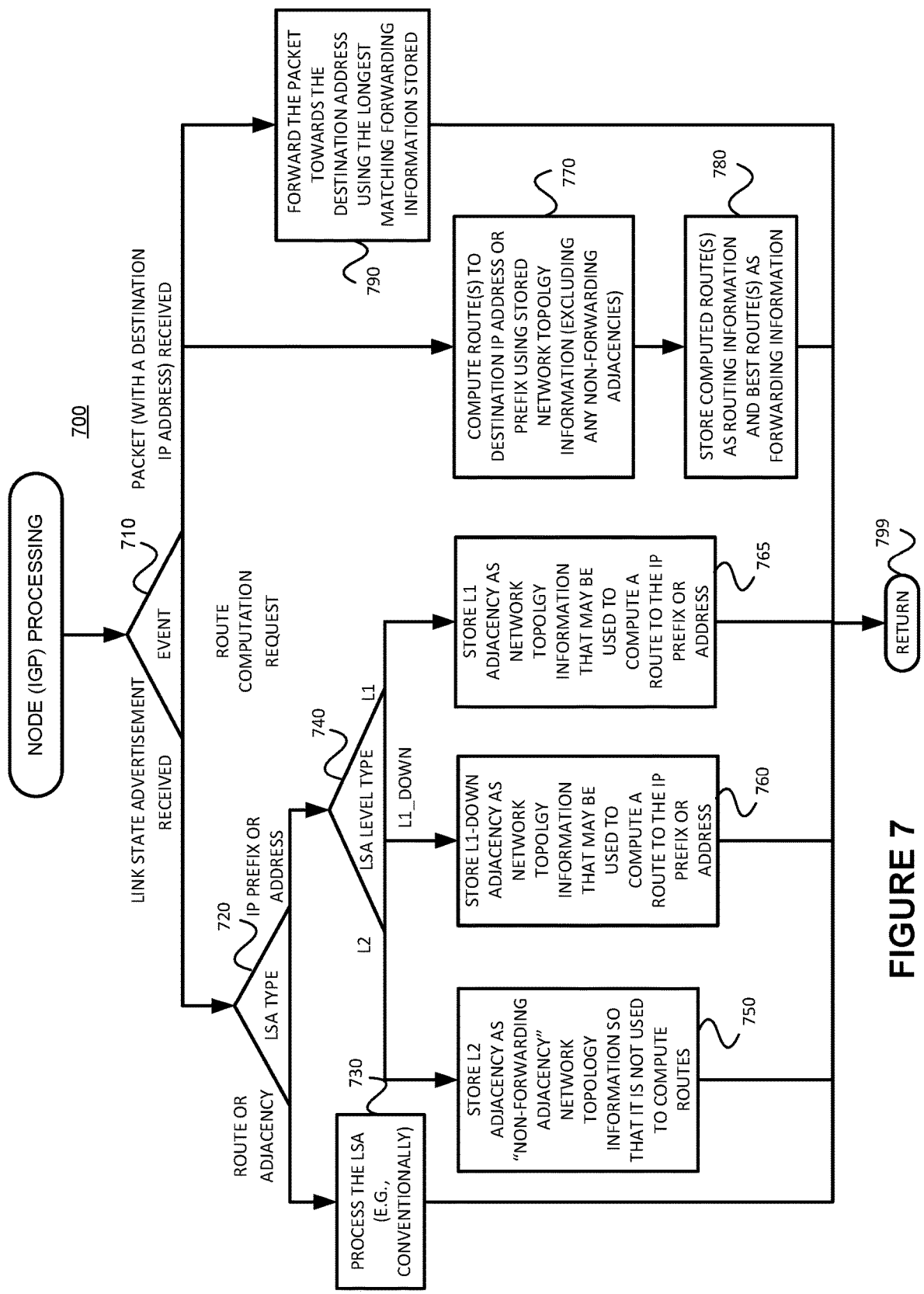

FIG. 7 is a flow diagram of an example method, consistent with the present description, for various IGP processing by a node, such as a node in one of the example Clos networks of FIG. 4.

Figure 8:
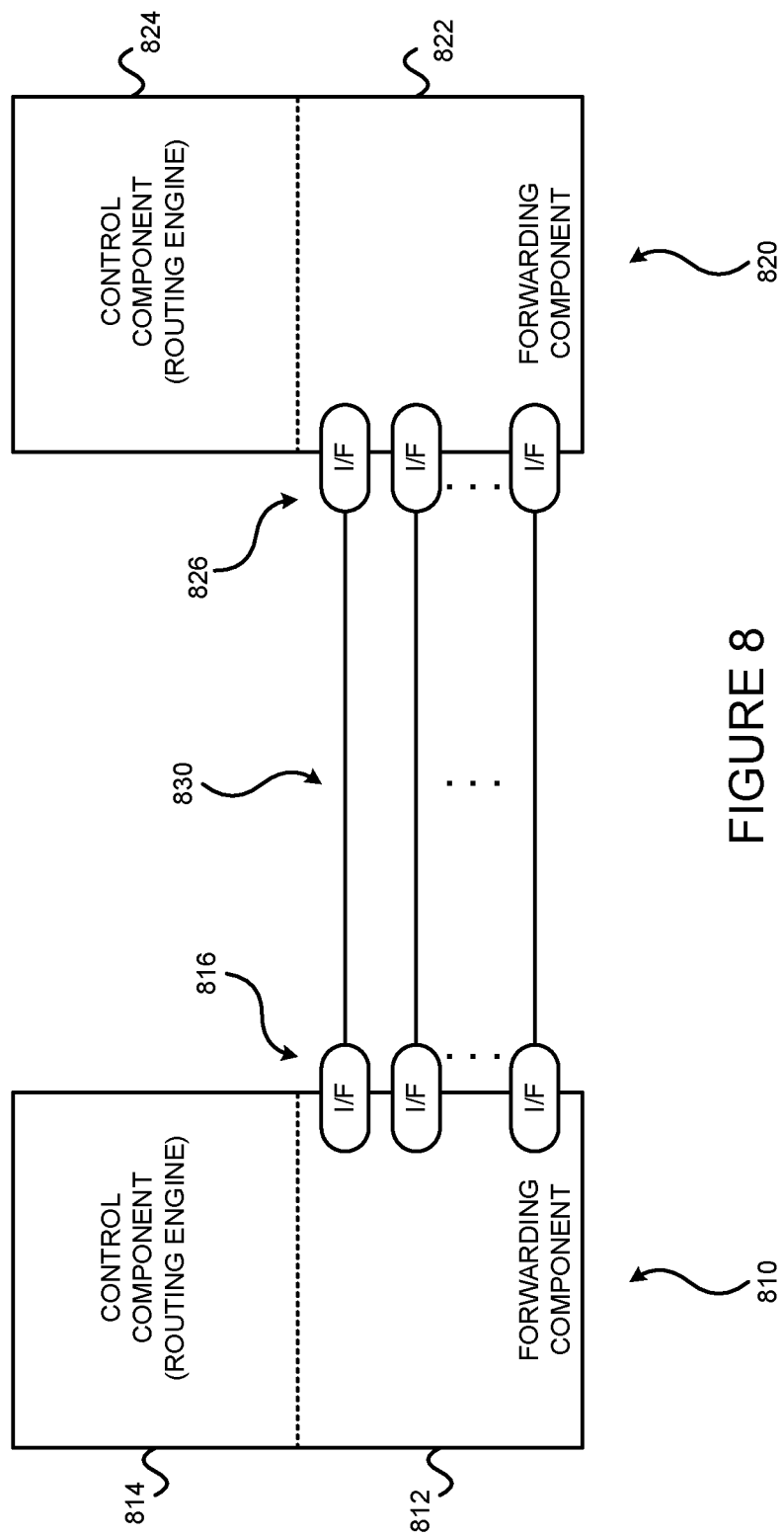

FIG. 8 illustrates an example environment including two systems coupled via communications links.

Figure 9:
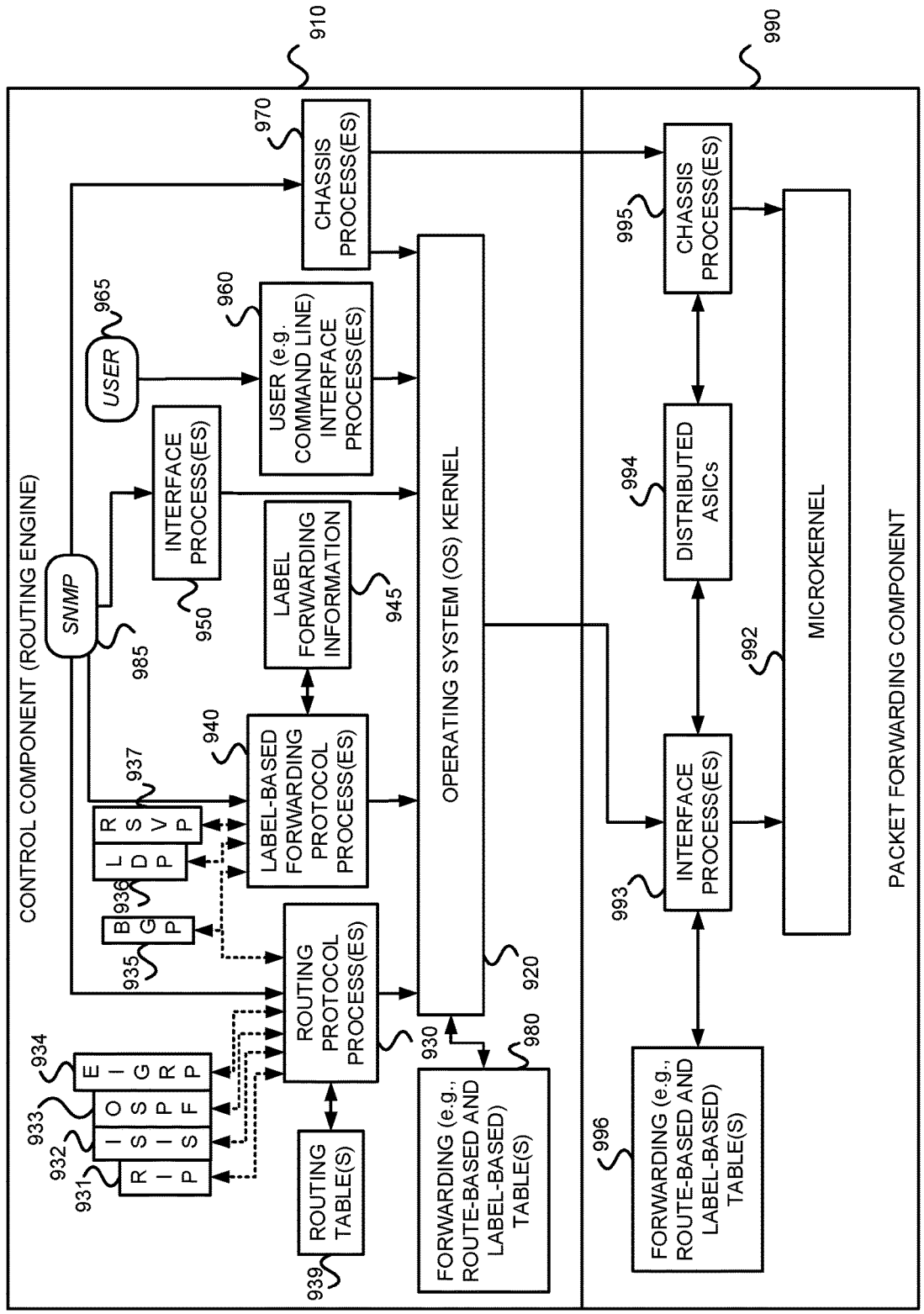

FIG. 9 is a block diagram of an example router on which the example methods of the present description may be implemented.

Figure 10:
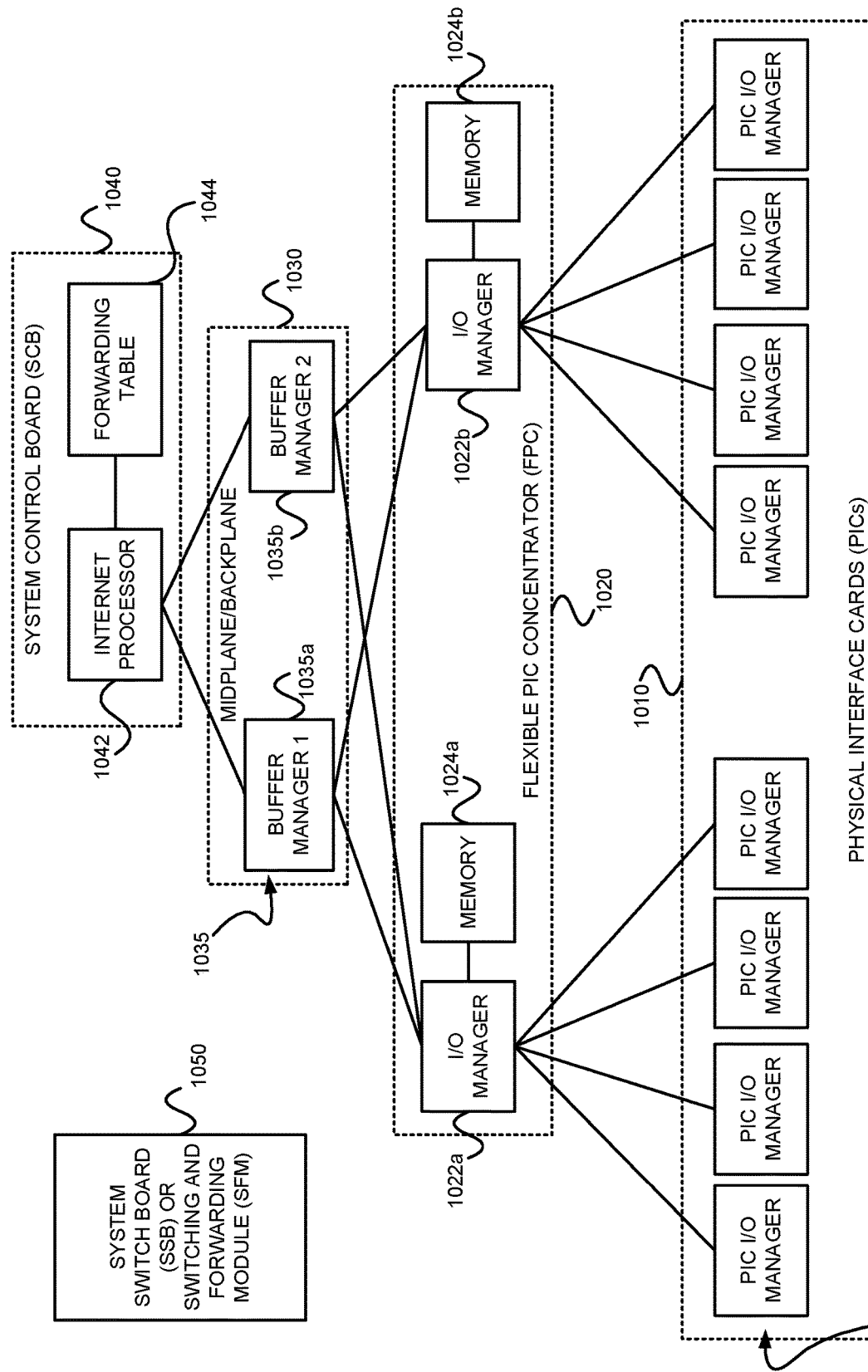

FIG. 10 is a block diagram of example distributed application specific integrated circuits ("ASICs") that may be provided in the example router of FIG. 9.

FIGS. 11A and 11B illustrate example packet forwarding operations of the example distributed ASICs of FIG. 10.

Figure 12:
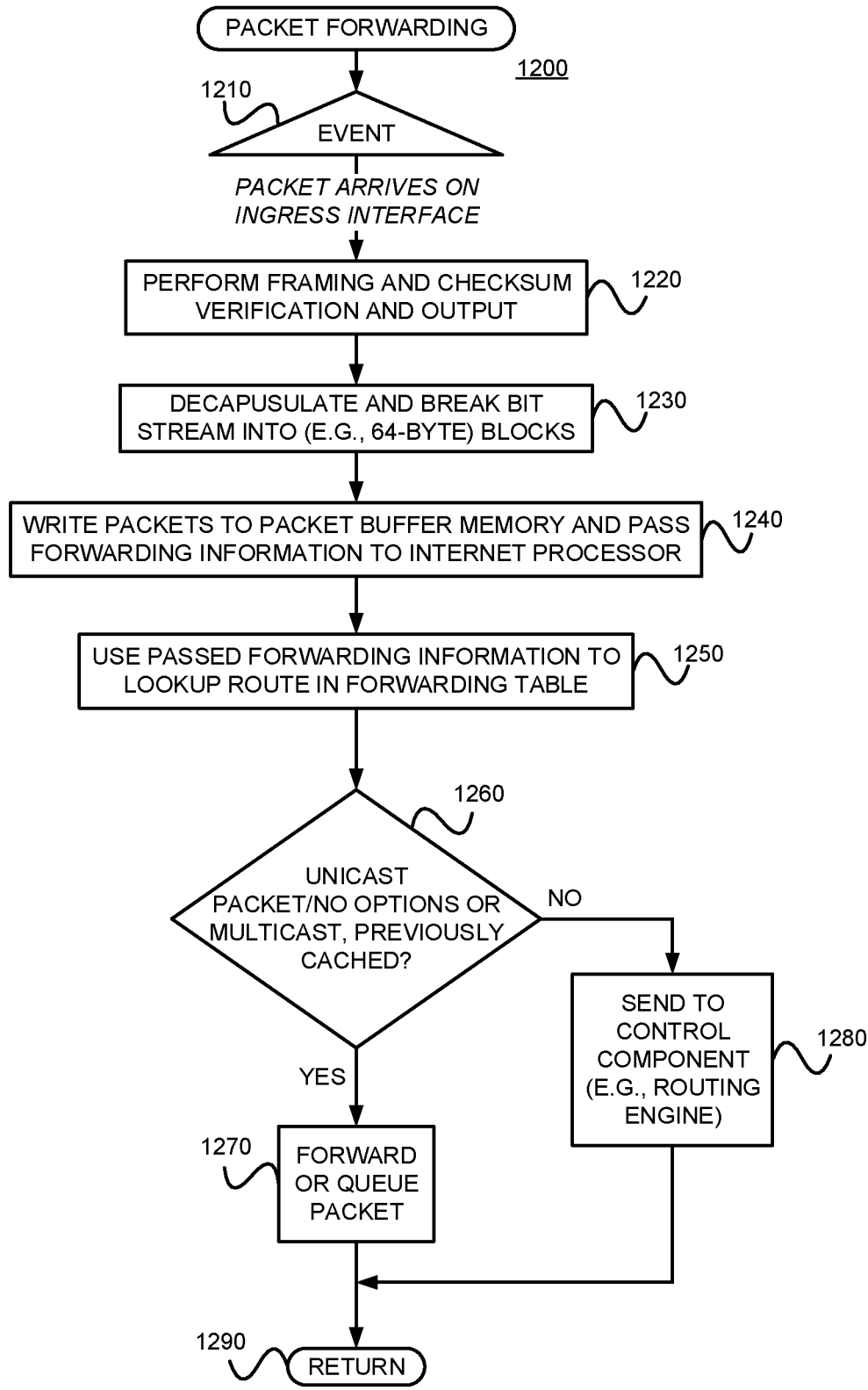

FIG. 12 is a flow diagram of an example packet forwarding method that may be implemented on any of the example routers of FIGS. 9 and 10.

Figure 13:
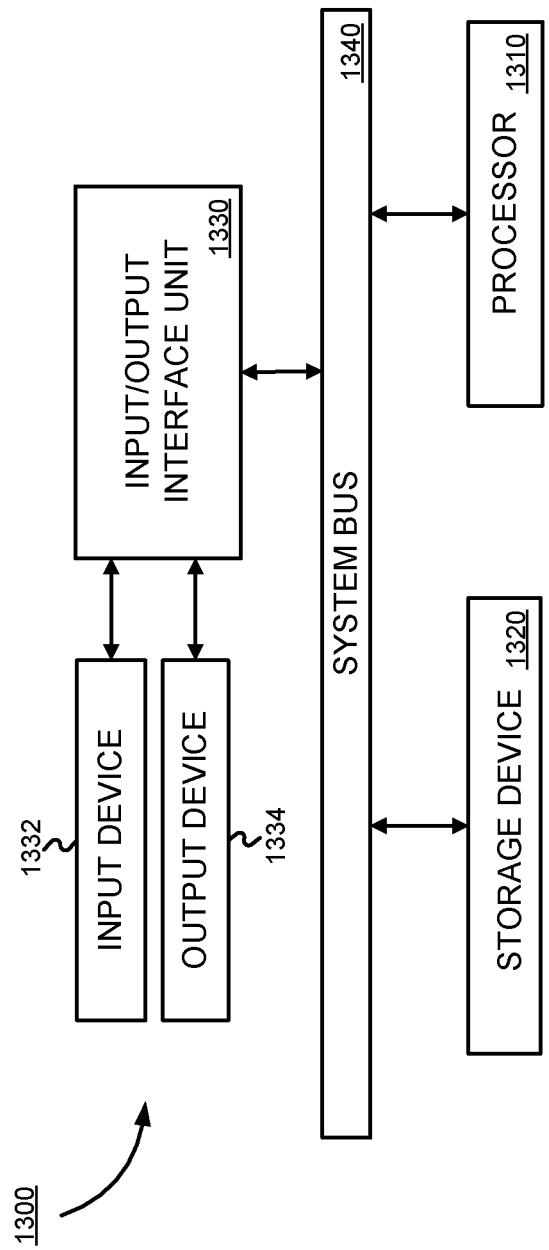

FIG. 13 is a block diagram of an example processor-based system that may be used to execute the example methods for processing an egress packet and/or to store information used and/or generated by such example methods.

§ 4. DETAILED DESCRIPTION

The present disclosure may involve novel methods, apparatus, message formats, and/or data structures for provisioning large Clos networks in a manner that preferably (1) is scalable, (2) ensures L2 backbone connectivity, (3) avoids or minimizes the use of L2 tunnels for forwarding traffic, and (4) considers otherwise hidden network topology information when computing routes. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Definitions

The following terms may be used in this disclosure.

Forwarding Information Base (or "FIB"): A data structure used to forward a received (ingress) packet towards its destination by determining a next hop.

"Interior Gateway Protocol (or "IGP")": A routing protocol used to exchange routing information among routers within a single Autonomous System (AS).

"Next Hop": A next node (e.g., switch or router) to which a packet is sent from any given router as it traverses a network on its way to its final destination.

"Prefix": part of an address that defines part of a communications network (e.g., a subnetwork), such as an Internet Protocol ("IP") network for example.

"Route": A unit of information that pairs a set of destinations with the attributes of a path to those destinations. The set of destinations are systems whose IP addresses are contained in one IP address prefix.

"RIB": Routing Information Base.

§ 4.2 Example Clos Environment

Figure 5:
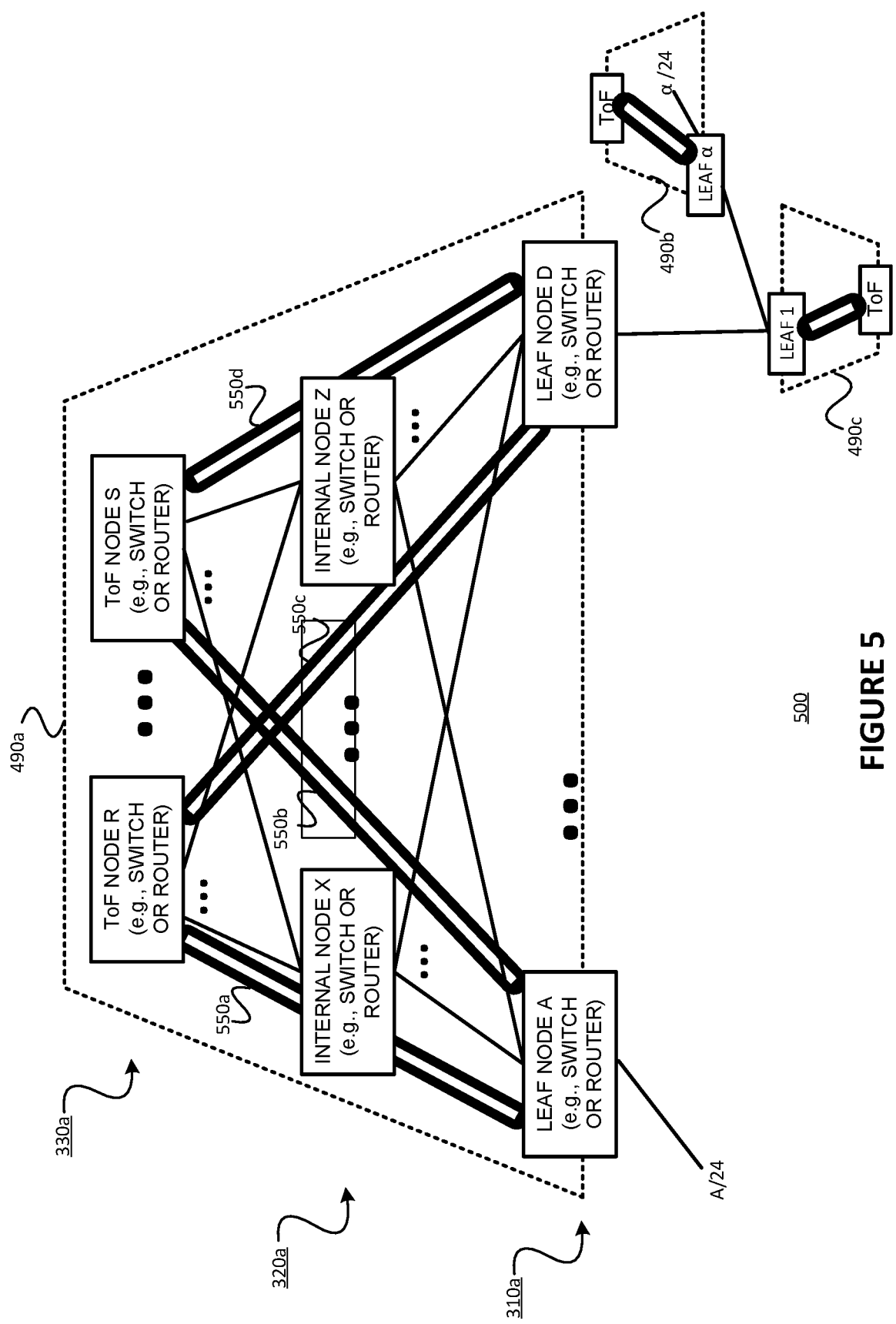
FIG. 5 illustrates the use of L2 tunnels, consistent with the present description, to avoid partitioning a L2 backbone in the example environment of FIG. 4.

Referring to FIG. 5, a first example environment 500 has an N-star topology in L2 overlaying the L1 abstracted Clos to connect L2 backbone, as indicated by tunnels 550a-550d Leaf nodes (A, . . . , D) and ToF nodes (R, . . . , S) are IGP (e.g., IS-IS) L1L2 nodes, while internal nodes (X, . . . , Z) are IGP (e.g., IS-IS) L1 nodes. As shown, prefix A/24 from a source (not shown) can be reached from everywhere via SPF. Similarly, prefix α/24 from a source (not shown) can be reached from everywhere via SPF.

As described in § 4.2.1 below, example embodiments consistent with the present description ensure L2 backbone connectivity. As described in § 4.2.2 below, example embodiments consistent with the present description avoid or minimize the use of L2 tunnels for forwarding traffic (and may consider otherwise hidden network topology information when computing routes).

§ 4.2.1 Ensuring L2 Backbone Connectivity

In the example environment 500, each leaf node maintains an L2 tunnel 550 adjacency to each ToF node. The tunnels 550 between the leaf nodes and ToF nodes define a bipartite graph. Although it is possible for each and every leaf node to have an L2 tunnel adjacency with each and every ToF node, this is not necessary. The only requirement is that the L2 backbone not be partitioned. (Per the Clos topology, no ToF node is directly linked with any other ToF node, and no leaf node is directly linked with any other leaf node.) Even if each and every leaf node has an L2 tunnel adjacency with each and every ToF node, scaling is significantly better since internal nodes (e.g., distribution nodes) and many other links are omitted from L2 of the IGP. Further, if each and every leaf node is to have an L2 tunnel adjacency with each and every ToF node, building the L2 tunnel mesh (though without any L2 tunnel(s) or direct link(s) between any ToF nodes, and without any L2 tunnel(s) or direct link(s) between any leaf nodes) to "connect the L2 backbone" can be configured automatically, provided that the ToF nodes and leaf nodes can be identified as such. As described in more detail below, the ToF nodes and the leaf nodes can be automatically discovered by providing appropriate identifiers in link state advertisements (LSAs).

§ 4.2.2 Avoiding or Minimizing the Use of L2 Tunnels for Forwarding Traffic (and Considering Otherwise Hidden Network Topology Information when Computing Routes)

Still referring to FIG. 5, the provisioning of L2 tunnels, by itself, might not provide a totally satisfactory solution since forwarding would be forced over L2 tunnels to and from the ToF nodes, even if the traffic to be forwarded could take a much shorter L1 path and/or a path that could avoid encapsulation/decapsulation necessitated by forwarding over L2 tunnels. For example, if leaf node D wanted to reach A/24, it might be advantageous for it to do so via internal node X and/or internal node Z, instead of via ToF node R and/or ToF node S.

To avoid forcing traffic over L2 tunnels to and from the ToF nodes, example embodiments consistent with the present description combine (1) using a "non-forwarding" adjacency and (2) "leaking" of L2 prefixes into L1. The use of "leaking" and "non-forwarding adjacencies" are described below.

As is known, the IGP link state advertisements (LSAs) can be thought of as envelopes carrying adjacency information, and/or reachability information (e.g., as IP prefixes or IP addresses). An LSA in L1 of the IGP can be distinguished from an LSA in L2 of the IGP. Further, information from an L2 LSA can be "leaked" down to L1 of the IGP. Such leaked information is commonly referred to as "L1-down" information. Such leaking may be performed using various techniques, such as, for example, those described in the document, "Domain-wide Prefix Distribution with Two-Level IS-IS," *Request for Comments* 2966 (Internet Engineering Task Force, October 2000) (referred to as "RFC 2966 and incorporated herein by reference), and in the document "L1/L2 Optimal IS-IS Routing" *draft-ietf-isis-l1l2-00.txt* (Internet Engineering Task Force, Feb. 15, 1999) (referred to as "L1L2 IS-IS draft" and incorporated herein by reference).

Referring, for example, to FIG. 6A, the IP prefix α/24, used to reach leaf node α, may be flooded within the L2 level, as indicated by (1) an L2 LSA from leaf node α to leaf node 1, (2) an L2 LSA from leaf node 1 to leaf node D. (3) an L2 LSA from leaf node D to ToF node S, (4) from ToF node S to leaf node A, etc. Although not all are shown, L2 LSAs carrying this prefix are flooded to every L2 (or L1L2) node in the IGP. (Note that if the L2 backbone was partitioned, flooding the L2 LSAs would not be possible. This is one reason that the L2 backbone cannot have any partitions.)

Still referring to FIG. 6, the IP prefix α/24 is also carried, in L1 down LSAs, from L1L2 nodes to L1 nodes (and from L1 nodes to other L1 nodes, and from L1 nodes to L1L2 nodes) in the IGP.

Thus, in this example, leaf node A will receive, IP prefix α/24 as both an L2 prefix and an L1-down prefix. Referring now to FIG. 6B, leaf node A will store the IP prefix α/24 as both a L2 and L-down link state information (e.g., in a link state database) 610. However, since the leaf node A will want to avoid using an L2 tunnel for forwarding data destined for leaf node α, the stored L2 IP prefix α/24 will be identified (e.g., with a flag, one or more bits, etc.) as a "non-forwarding" adjacency. In this way, when leaf node A computes a route (or routes) to leaf node α, it will not use any L2 tunnel adjacency. Alternatively, the leaf node A can be programmed or configured to only use an L2 tunnel adjacency for computing a route to leaf node α if there is no L1-down (or L1) adjacency available. As another alternative, the cost (for purposes of computing a least cost or shortest path route) of an L2 tunnel adjacency can be set to a higher value than an L1 down or L1 adjacency so that it is (e.g., strongly) disfavored. As a result, as shown in FIG. 6B, routing information (e.g., route information base or "RIB") 620 will not include a route to leaf node a via L2 tunnel 550a or via L2 tunnel 550b. The forwarding information (e.g., forwarding information base or "FIB") 620 stored by leaf node A will include an entry for forwarding a packet destined for leaf node α (or any node in the subnet α/24) an internal node (e.g., node X or node Z, depending on which has a shorter path, or as equal cost multipaths). For example, if the link 699 did not exist, leaf A could reach leaf node a via four hops (internal node Z, leaf node D, leaf node 1 and leaf node α) or via six hops (node X, ToF node S, node Z, leaf node D, leaf node 1 and leaf node α). Therefore, in such a case, the forwarding information for left node A would include a next hop for packets destined for leaf node α (or any node in the subnet α/24) via internal node Z and interface AZ.

As opposed to the improvements described, in a conventional case, leaf node A would compute one or more L2 route(s) to the α/24 prefix via one or more L2 backbone link(s). In the conventional case, leaf node A would install the computed L2 route(s) and leak it as an L1-down route into L1. The L1-down route is flooded over L1 (Note that L1-down routes are less preferred than L2 route, in order to avoid loops.) In conventional operation, leaf node A would compute multiple routes to α/24; for example, via L2 and the tunnel to ToF node R, via L2 and the tunnel to ToF node S, via L1/down to internal node X, via L1/down to internal node Z, etc. Normally, in the conventional case, the L2 route would be preferred (to avoid loops, as noted above), but the present inventors recognized that this would cause undesired encapsulation and decapsulation, and might ignore a shorter L1-down route. To avoid using the L2 tunnel, in an example embodiment consistent with the present improvement, leaf node A identifies the L2 tunnels to ToF nodes R and S (e.g., as "non-forwarding" adjacencies) such that the L2 route is not computed and/or installed, and not leaked as an L2 route. (Alternatively, the L2 route could be computed, but not used and not leaked. However, such an alternative would perform unnecessary route computations.) Under the example improved embodiment, the installed L1-down route(s) in L1 towards internal node X or Z is now the only active route. That is, the L1-down route(s) no longer competes with an L2 route that would otherwise be prioritized over it in the conventional case. Thus, the example improved embodiment allows leaf node A to forward traffic destined for leaf node α via L1 (and thus without encapsulation).

In summary, L2 prefixes are kept, but L2 routes are either not computed, or not used.

§ 4.3 Example Methods

FIG. 7 is a flow diagram of an example method 700 for performing IGP processing at a node (e.g., a leaf node or a ToF node in a Clos network) in a manner consistent with the present description. As indicated by event branch point 710, various branches of the example method 700 may be performed in response to the occurrence of various events. For example, in the event that a link state advertisement (LSA) (e.g., an IS-IS LSP) is received, the example method 700 determines what is carried in the LSA (e.g., route, adjacency or IP prefix or address). (Branch point 720) If a route or adjacency is carried in the LSA, such information may be processed conventionally (Block 730), before the method 700 is left (Node 799). If, on the other hand, an IP prefix or address is carried in the LSA, the example method 700 then determines the level of the LSA. (Branch point 740)

Still referring to branch point 740, if the LSA is an L2 LSA carrying an IP prefix or address, the adjacency associated with the IP prefix or address is stored as "non-forwarding" adjacency network topology information so that it will not be used to compute routes (Block 750), before the example method 700 is left (Node 799). (Recall, e.g., the first two entries in the network topology information 610 of FIG. 6B.) Referring back to branch point 740, if LSA is an L1-down LSA carrying an IP prefix or address, the adjacency associated with the IP prefix or address is stored as network topology information that may be used to compute a route(s) to the IP address or prefix (Block 760), before the example method 700 is left (Node 799). (Recall, e.g., the last two entries in the network topology information 610 of FIG. 6B.) Finally, referring back to branch point 740, if the LSA is a L1 LSA carrying an IP prefix or address, the adjacency associated with the IP prefix or address may be processed in a conventional manner (e.g., stored as network topology information that may be used to compute a route(s) to the IP address or prefix (Block 765), before the example method 700 is left (Node 799). Note that IP prefixes or addresses outside the Clos will not be in L1 LSAs. Rather, they will be in L1-down or L2 LSAs.

Referring back to branch point 710, in the event that route computation is requested (e.g., internally generated, or from a received external request), the example method 700 may compute route(s) to a destination IP address(es) or prefix(es) using stored network topology information, excluding any non-forwarding adjacencies. (Block 770) Then, the computed route(s) can be stored as routing information (e.g., in a routing information base, or "RIB"), and the best route(s) may be stored as forwarding information (e.g., in a forwarding information base, or "FIB") (Block 780), before the example method 700 is left (Node 799). (Recall, e.g., table 620 of FIG. 6B.) The best route may be a single route, or may be multiple routes (e.g., used in equal cost multipath forwarding (ECMP)).

Finally, referring back to event branch point 710, in the event that a packet (having a destination IP address) is received, the example method 700 forwards the packet towards the destination address using the longest matching forwarding information stored (Block 790), before the example method 700 is left (Node 799). Such forwarding may be done in a conventional manner. Although not shown, if there is no forwarding information matching the destination IP address of the packet, the packet may be dropped.

§ 4.4 Example Apparatus

FIG. 8 illustrates two data forwarding systems 810 and 820 coupled via communications links 830. The links may be physical links or "wireless" links. The data forwarding systems 810,820 may be nodes, such as routers for example, in a Clos network. If the data forwarding systems 810,820 are example routers, each may include a control component (e.g., a routing engine) 814,824 and a forwarding component 812,822. Each data forwarding system 810,820 includes one or more interfaces 816,826 that terminate one or more communications links 830.

As just discussed above, and referring to FIG. 9, some example routers 900 include a control component (e.g., routing engine) 910 and a packet forwarding component (e.g., a packet forwarding engine) 990.

The control component 910 may include an operating system (OS) kernel 920, routing protocol process(es) 930, label-based forwarding protocol process(es) 940, interface process(es) 950, user interface (e.g., command line interface) process(es) 960, and chassis process(es) 970, and may store routing table(s) 939, label forwarding information 945, and forwarding (e.g., route-based and/or label-based) table(s) 980. As shown, the routing protocol process(es) 930 may support routing protocols such as the routing information protocol ("RIP") 931, the intermediate system-to-intermediate system protocol ("IS-IS") 932, the open shortest path first protocol ("OSPF") 933, the enhanced interior gateway routing protocol ("EIGRP") 934 and the border gateway protocol ("BGP") 935, and the label-based forwarding protocol process(es) 940 may support protocols such as BGP 935, the label distribution protocol ("LDP") 936 and the resource reservation protocol ("RSVP") 937. One or more components (not shown) may permit a user 965 to interact with the user interface process(es) 960. Similarly, one or more components (not shown) may permit an outside device to interact with one or more of the router protocol process(es) 930, the label-based forwarding protocol process(es) 940, the interface process(es) 950, and the chassis process(es) 970, via SNMP 985, and such processes may send information to an outside device via SNMP 985. At least some parts of the example method 700 may be implemented in the routing protocol process(es) 930.

The packet forwarding component 990 may include a microkernel 992, interface process(es) 993, distributed ASICs 994, chassis process(es) 995 and forwarding (e.g., route-based and/or label-based) table(s) 996.

In the example router 900 of FIG. 9, the control component 910 handles tasks such as performing routing protocols, performing label-based forwarding protocols, control packet processing, etc., which frees the packet forwarding component 990 to forward received packets quickly. That is, received control packets (e.g., routing protocol packets and/or label-based forwarding protocol packets) are not fully processed on the packet forwarding component 990 itself, but are passed to the control component 910, thereby reducing the amount of work that the packet forwarding component 990 has to do and freeing it to process packets to be forwarded efficiently. Thus, the control component 910 is primarily responsible for running routing protocols and/or label-based forwarding protocols, maintaining the routing tables and/or label forwarding information, sending forwarding table updates to the packet forwarding component 990, and performing system management. The example control component 910 may handle routing protocol packets, provide a management interface, provide configuration management, perform accounting, and provide alarms. The processes 930, 940, 950, 960 and 970 may be modular, and may interact with the OS kernel 920. That is, nearly all of the processes communicate directly with the OS kernel 920. Using modular software that cleanly separates processes from each other isolates problems of a given process so that such problems do not impact other processes that may be running. Additionally, using modular software facilitates easier scaling.

Still referring to FIG. 9, the example OS kernel 920 may incorporate an application programming interface ("API") system for external program calls and scripting capabilities. The control component 910 may be based on an Intel PCI platform running the OS from flash memory, with an alternate copy stored on the router's hard disk. The OS kernel 920 is layered on the Intel PCI platform and establishes communication between the Intel PCI platform and processes of the control component 910. The OS kernel 920 also ensures that the forwarding tables 996 in use by the packet forwarding component 990 are in sync with those 980 in the control component 910. Thus, in addition to providing the underlying infrastructure to control component 910 software processes, the OS kernel 920 also provides a link between the control component 910 and the packet forwarding component 990.

Referring to the routing protocol process(es) 930 of FIG. 9, this process(es) 930 provides routing and routing control functions within the platform. In this example, the RIP 931, IS-IS 932, OSPF 933 and EIGRP 934 (and BGP 935) protocols are provided. Naturally, other routing protocols may be provided in addition, or alternatively. Similarly, the label-based forwarding protocol process(es) 940 provides label forwarding and label control functions. In this example, the LDP 936 and RSVP 937 (and BGP 935) protocols are provided. Naturally, other label-based forwarding protocols (e.g., MPLS) may be provided in addition, or alternatively. In the example router 900, the routing table(s) 939 is produced by the routing protocol process(es) 930, while the label forwarding information 945 is produced by the label-based forwarding protocol process(es) 940.

Still referring to FIG. 9, the interface process(es) 950 performs configuration of the physical interfaces (Recall, e.g., 816 and 826 of FIG. 8.) and encapsulation.

The example control component 910 may provide several ways to manage the router. For example, it 910 may provide a user interface process(es) 960 which allows a system operator 965 to interact with the system through configuration, modifications, and monitoring. The SNMP 985 allows SNMP-capable systems to communicate with the router platform. This also allows the platform to provide necessary SNMP information to external agents. For example, the SNMP 985 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 910, thereby avoiding slowing traffic forwarding by the packet forwarding component 990.

Although not shown, the example router 900 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 960 via a console port, an auxiliary port, and/or a management Ethernet port. Some aspects of the example method 700 (e.g., marking L2 adjacencies as "non-forwarding" adjacencies, and/or disabling L2 routes, etc.) may be configured manually in some example embodiments.

The packet forwarding component 990 is responsible for properly outputting received packets as quickly as possible. If there is no entry in the forwarding table for a given destination or a given label and the packet forwarding component 990 cannot perform forwarding by itself, it 990 may send the packets bound for that unknown destination off to the control component 910 for processing. The example packet forwarding component 990 is designed to perform Layer 2 and Layer 3 switching, route lookups, and rapid packet forwarding.

As shown in FIG. 9, the example packet forwarding component 990 has an embedded microkernel 992, interface process(es) 993, distributed ASICs 994, and chassis process(es) 995, and stores a forwarding (e.g., route-based and/or label-based) table(s) 996. The microkernel 992 interacts with the interface process(es) 993 and the chassis process(es) 995 to monitor and control these functions. The interface process(es) 992 has direct communication with the OS kernel 920 of the control component 910. This communication includes forwarding exception packets and control packets to the control component 910, receiving packets to be forwarded, receiving forwarding table updates, providing information about the health of the packet forwarding component 990 to the control component 910, and permitting configuration of the interfaces from the user interface (e.g., CLI) process(es) 960 of the control component 910. The stored forwarding table(s) 996 is static until a new one is received from the control component 910. The interface process(es) 993 uses the forwarding table(s) 996 to look up next-hop information. The interface process(es) 993 also has direct communication with the distributed ASICs 994. Finally, the chassis process(es) 995 may communicate directly with the microkernel 992 and with the distributed ASICs 994.

In the example router 900, at least some parts of the example method 700 consistent with the present disclosure may be implemented in the routing protocol process(es) 930 and/or in the packet forwarding component 990.

Referring back to distributed ASICs 994 of FIG. 9, FIG. 10 is an example of how the ASICS may be distributed in the packet forwarding component 990 to divide the responsibility of packet forwarding. As shown in FIG. 10, the ASICs of the packet forwarding component 990 may be distributed on physical interface cards ("PICs") 1010, flexible PIC concentrators ("FPCs") 1020, a midplane or backplane 1030, and a system control board(s) 1040 (for switching and/or forwarding). Switching fabric is also shown as a system switch board ("SSB"), or a switching and forwarding module ("SFM") 1050. Each of the PICs 1010 includes one or more PIC I/O managers 1015. Each of the FPCs 1020 includes one or more I/O managers 1022, each with an associated memory 1024. The midplane/backplane 1030 includes buffer managers 1035a, 1035b. Finally, the system control board 1040 includes an internet processor 1042 and an instance of the forwarding table 1044 (Recall, e.g., 996 of FIG. 9).

Still referring to FIG. 10, the PICs 1010 contain the interface ports. Each PIC 1010 may be plugged into an FPC 1020. Each individual PIC 1010 may contain an ASIC that handles media-specific functions, such as framing or encapsulation. Some example PICs 1010 provide SDH/SONET, ATM, Gigabit Ethernet, Fast Ethernet, and/or DS3/E3 interface ports.

An FPC 1020 can contain from one or more PICs 1010, and may carry the signals from the PICs 1010 to the midplane/backplane 1030 as shown in FIG. 10.

The midplane/backplane 1030 holds the line cards. The line cards may connect into the midplane/backplane 1030 when inserted into the example router's chassis from the front. The control component (e.g., routing engine) 910 may plug into the rear of the midplane/backplane 1030 from the rear of the chassis. The midplane/backplane 1030 may carry electrical (or optical) signals and power to each line card and to the control component 910.

The system control board 1040 may perform forwarding lookup. It 1040 may also communicate errors to the routing engine. Further, it 1040 may also monitor the condition of the router based on information it receives from sensors. If an abnormal condition is detected, the system control board 1040 may immediately notify the control component 910.

Referring to FIGS. 10, 11A and 11B, in some exemplary routers, each of the PICs 1010,910' contains at least one I/O manager ASIC 1015 responsible for media-specific tasks, such as encapsulation. The packets pass through these I/O ASICs on their way into and out of the router. The I/O manager ASIC 1015 on the PIC 1010,910' is responsible for managing the connection to the I/O manager ASIC 1022 on the FPC 1020,920', managing link-layer framing and creating the bit stream, performing cyclical redundancy checks (CRCs), and detecting link-layer errors and generating alarms, when appropriate. The FPC 1020 includes another I/O manager ASIC 1022. This ASIC 1022 takes the packets from the PICs 1010 and breaks them into (e.g., 64-byte) memory blocks. This FPC I/O manager ASIC 1022 sends the blocks to a first distributed buffer manager (DBM) 1035a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 1035a' manages and writes packets to the shared memory 1024 across all FPCs 1020. In parallel, the first DBM ASIC 1035a' also extracts information on the destination of the packet and passes this forwarding-related information to the Internet processor 1042/942'. The Internet processor 1042/942' performs the route lookup using the forwarding table 1044 and sends the information over to a second DBM ASIC 1035b'. The Internet processor ASIC 1042/942' also collects exception packets (i.e., those without a forwarding table entry) and sends them to the control component 910. The second DBM ASIC 1035b' then takes this information and the 64-byte blocks and forwards them to the I/O manager ASIC 1022 of the egress FPC 1020/920' (or multiple egress FPCs, in the case of multicast) for reassembly. (Thus, the DBM ASICs 1035a' and 1035b' are responsible for managing the packet memory 1024 distributed across all FPCs 1020/920', extracting forwarding-related information from packets, and instructing the FPC where to forward packets.)

The I/O manager ASIC 1022 on the egress FPC 1020/920' may perform some value-added services. In addition to incrementing time to live ("TTL") values and re-encapsulating the packet for handling by the PIC 1010, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1022 on the egress FPC 1020/920' may be responsible for receiving the blocks from the second DBM ASIC 1035b', incrementing TTL values, queuing a pointer to the packet, if necessary, before applying CoS rules, re-encapsulating the blocks, and sending the encapsulated packets to the PIC I/O manager ASIC 1015.

FIG. 12 is a flow diagram of an example method 1200 for providing packet forwarding in the example router. The main acts of the method 1200 are triggered when a packet is received on an ingress (incoming) port or interface. (Event 1210) The types of checksum and frame checks that are required by the type of medium it serves are performed and the packet is output, as a serial bit stream. (Block 1220) The packet is then decapsulated and parsed into (e.g., 64-byte) blocks. (Block 1230) The packets are written to buffer memory and the forwarding information is passed on the Internet processor. (Block 1240) The passed forwarding information is then used to lookup a route in the forwarding table. (Block 1250) (Recall, e.g., 620 of FIG. 6B.) Note that the forwarding table can typically handle unicast packets that do not have options (e.g., accounting) set, and multicast packets for which it already has a cached entry. Thus, if it is determined that these conditions are met (YES branch of Decision 1260), the packet forwarding component finds the next hop and egress interface, and the packet is forwarded (or queued for forwarding) to the next hop via the egress interface (Block 1270) before the method 1200 is left (Node 1290) Otherwise, if these conditions are not met (NO branch of Decision 1260), the forwarding information is sent to the control component 910 for advanced forwarding resolution (Block 1280) before the method 1200 is left (Node 1290).

Referring back to block 1270, the packet may be queued. Actually, as stated earlier with reference to FIG. 10, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1022 may send a request for the packet to the second DBM ASIC 1035b. The DBM ASIC 1035 reads the blocks from shared memory and sends them to the I/O manager ASIC 1022 on the FPC 1020, which then serializes the bits and sends them to the media-specific ASIC of the egress interface. The I/O manager ASIC 1015 on the egress PIC 1010 may apply the physical-layer framing, perform the CRC, and send the bit stream out over the link.

Referring back to block 1280 of FIG. 12, as well as FIG. 10, regarding the transfer of control and exception packets, the system control board 1040 handles nearly all exception packets. For example, the system control board 1040 may pass exception packets to the control component 910.

Although example embodiments consistent with the present disclosure may be implemented on the example routers of FIG. 8 or 9, embodiments consistent with the present disclosure may be implemented on communications network nodes (e.g., routers, switches, etc.) having different architectures. More generally, embodiments consistent with the present disclosure may be implemented on an example system 1300 as illustrated on FIG. 13.

FIG. 13 is a block diagram of an exemplary machine 1300 that may perform one or more of aspects of example methods consistent with example method 700 of FIG. 7, and/or store information used and/or generated by such example methods. The exemplary machine 1300 includes one or more processors 1310, one or more input/output interface units 1330, one or more storage devices 1320, and one or more system buses and/or networks 1340 for facilitating the communication of information among the coupled elements. One or more input devices 1332 and one or more output devices 1334 may be coupled with the one or more input/output interfaces 1330. The one or more processors 1310 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1320 and/or may be received from an external source via one or more input interface units 1330. The machine executable instructions may be stored as various software modules, each module performing one or more operations. Functional software modules are examples of components which may be used in the apparatus described.

In some embodiments consistent with the present disclosure, the processors 1310 may be one or more microprocessors and/or ASICs. The bus 1340 may include a system bus. The storage devices 1320 may include system memory, such as read only memory (ROM) and/or random access memory (RAM). The storage devices 1320 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.5 Refinements and Alternatives

Although described as routers and/or switches, nodes may represent other types of devices capable of performing the foregoing node operations.

The purpose of the L2 tunnels is to ensure that the L2 backbone is not partitioned. In one example, within a Clos, each (and every) leaf node can be connected, via an L2 tunnel, with each (and every) ToF node. This configuration will define a bipartite graph (which will be isomorphic with an N-star graph). However, it is possible to have each leaf node, in a Clos, to be connected with one (e.g., the same) ToF node. This confirmation will define a star or hub and spoke graph topology, with the ToF node being the center or hub. However, such a topology has a single point of failure.

Thus, it might be desired to have each leaf node in a Clos to be connected to at least two ToF nodes. To reiterate, it is important to ensure that the LS backbone is not partitioned, and various network topologies using L2 tunnels that meet this goal are possible. Note that in a Clos network, a ToF node will not be directly connected with any other ToF node, and a leaf node will not be directly connected with any other leaf node.

Referring back to block 750 of FIG. 7, in some example methods consistent with the present description, rather than storing an L2 adjacency as a non-forwarding adjacency which is not used to compute routes, an L2 route can be computed but appropriately marked or otherwise identified so that it is not used for forwarding, or so that it is only used for forwarding if no other (e.g., L-down) route is available.

In some example embodiments consistent with the present description, the fact that an L2 tunnel is non-forwarding may be advertised (e.g., via an L2 LSA carrying an adjacency) to an external device, such as an external controller for example.

Within a given Clos, each of the ToF node(s), the plurality of leaf nodes and the plurality of internal nodes belong to the same L1 area.

Although it is most important that L2 tunnels are not used for forwarding from a leaf node to a ToF node, some example embodiments consistent with the present description avoid use of L2 tunnels for forwarding in both directions; (1) from a leaf node to a ToF node, and (2) from a ToF node to a leaf node.

Routing information (e.g., a RIB) may have all (or one or more) computed routes. However, the forwarding information (e.g., FIB or forwarding table) will generally store just the best of the routes. Neither should store an L2 route, or if an L2 route is stored (e.g., in the RIB), it should be disabled in some way.

As already noted above, if each and every leaf node is to have an L2 tunnel adjacency with each and every ToF node, building the L2 tunnel mesh (though without any L2 tunnel(s) or direct link(s) between any ToF nodes, and without any L2 tunnel(s) or direct link(s) between any leaf nodes) to "connect the L2 backbone" can be configured automatically, provided that the ToF nodes and leaf nodes can be identified as such. As described in more detail below, the ToF nodes and the leaf nodes can be automatically discovered by providing appropriate identifiers in link state advertisements (LSAs).

§ 4.6 Conclusion(s)

As should be appreciated from the foregoing, example methods and apparatus consistent with the present description enables large scale Clos networks, ensures L2 backbone connectivity with L2 tunnels between leaf node(s) and ToF nodes, but avoid using such L2 for forwarded (to avoid encapsulation/decapsulation).

Example embodiments consistent with the present description provide better scaling of the L2 fabric than RFC 8099 and avoid (or at least reduce) tunneling.

Example embodiments consistent with the present description provide a simpler solution than Li area abstraction (assuming that the Li area abstraction will even prove feasible), with less protocol extensions and with no need for internal tunneling.

What is claimed is:

1. A Clos network comprising:
   a) at least one top-of-fabric (ToF) node, each of the at least one top of fabric nodes running both an interior gateway protocol (IGP) as a level 1 node and as a level 2 node (L1L2 node);
   b) a plurality of leaf nodes, each of the leaf nodes running the IGP as an L1L2 node; and
   c) a plurality of internal nodes arranged between the at least one ToF node and the plurality of leaf nodes, each of the internal nodes running the IGP as a level 1 (L1) node and at least one of the internal nodes having at least one link to a ToF node and at least one of the internal nodes having at least one link to a leaf node,
      wherein a plurality of level 2 (L2) tunnels exist between at least some of the ToF nodes and at least some of the leaf nodes via at least one internal node acting as a transit node, the plurality (L2) tunnels ensuring an unpartitioned L2 IGP backbone,
      wherein at least one of the leaf nodes stores network topology information including an adjacency to a ToF node via one of the L2 tunnels, which is identified as a non-forwarding adjacency such that the leaf node does not use the non-forwarding adjacency to forward traffic, and
      wherein at least one of the leaf nodes stores, in association with a given destination address or address prefix, a route to a destination with a next-hop to one of the plurality of internal nodes.

2. The Clos network of claim 1 wherein the next-hop to one of the plurality of internal nodes was learned as a level 1 down (L1-down) route distributed by the leaf node from level 2 (L2) downwards, and
   wherein the L1-down route is less preferred than an associated L2 route so that routing loops are avoided.

3. The Clos network of claim 1 wherein the at least one ToF node includes at least two ToF nodes.

4. The Clos network of claim 1 wherein each of the at least one ToF node, the plurality of leaf nodes and the plurality of internal nodes belong to the same L1 area of the IGP.

5. The Clos network of claim 1 wherein the plurality of L2 tunnels include, for each of the leaf nodes, a L2 tunnel between the leaf node and each of the at least one ToF nodes.

6. The Clos network of claim 5 wherein each of the plurality of L2 tunnels was autoconfigured.

7. The Clos network of claim 6 wherein level 1 link state advertisements within the Clos identify ToF nodes as ToF type, and identify leaf nodes as leaf type, and
   wherein the plurality of L2 tunnels were autoconfigured using the ToF type and leaf type information included in the level 1 link state advertisements.

8. The Clos network of claim 6 wherein level 1 link state advertisements within the Clos identify L2 or L2L1 nodes, and
   wherein the plurality of L2 tunnels were autoconfigured using the L2 or L2L1 node identify information included in the level 1 link state advertisements.

9. The Clos network of claim 1 wherein the IGP is at least one of (A) intermediate system-intermediate system (IS-IS), (B) open shortest path first (OSPF), and (C) routing in fat trees (RIFT).

10. The Clos network of claim 7 wherein the IGP being run as a level 1 IGP is different from the IGP being run as a level 2 IGP.

11. The Clos network of claim 7 wherein the IGP being run as a level 1 IGP is the same as the IGP being run as a level 2 IGP.

12. The Clos network of claim 1 wherein the at least one of the leaf nodes stores network topology information including an adjacency to a ToF node via one of the L2 tunnels, which is identified as a non-forwarding adjacency such that the leaf node does not use the non-forwarding adjacency to compute routes.

13. The Clos network of claim 1 wherein the at least one of the ToF nodes stores network topology information including an adjacency to a leaf node via one of the L2 tunnels, which is identified as a non-forwarding adjacency such that the ToF node does not use the non-forwarding adjacency to forward traffic.

14. A data forwarding device configured as a leaf node for use in a Clos network including (1) at least one top-of-fabric (ToF) node, each of the at least one top of fabric nodes running an interior gateway protocol (IGP) as a Level 1, Level 2 (L1L2) node, (2) at least one other leaf node running the IGP as an L1L2 node, and (3) a plurality of internal nodes arranged between the at least one ToF node and the plurality of leaf nodes, each of the internal nodes running the IGP as a level 1 (L1) node, wherein and at least one of the internal nodes has at least one link to a ToF node and at least one of the internal nodes has at least one link to a leaf node, the data forwarding device configured as a leaf node comprising:
   a) a non-transitory computer-readable storage medium storing
      1) network topology information including an adjacency to a ToF node via one of the L2 tunnels, which is identified as a non-forwarding adjacency such that the leaf node does not use the non-forwarding adjacency to forward traffic, and
      2) forwarding information including, for a given destination address or address prefix, a next-hop to one of the plurality of internal nodes; and
   b) a forwarding processor configured to forward data packets received by the data forwarding device in accordance with the forwarding information stored on the non-transitory computer-readable storage medium.

15. The data forwarding device of claim 14 further comprising:
   c) a routing engine configured to compute routes, wherein the routing engine does not use the stored network topology information including an adjacency to a ToF node via one of the L2 tunnels, which is identified as a non-forwarding adjacency, to compute routes.

16. The data forwarding device of claim 14 wherein the destination address or address prefix is a destination Internet protocol (IP) address or IP address prefix.

17. A computer-implemented method for use in a data forwarding device configured as a leaf node for use in a Clos network including (1) at least one top-of-fabric (ToF) node, each of the at least one top of fabric nodes running an interior gateway protocol (IGP) as a Level 1, Level 2 (L1L2) node, (2) at least one other leaf node running the IGP as an L1L2 node, and (3) a plurality of internal nodes arranged between the at least one ToF node and the plurality of leaf nodes, each of the internal nodes running the IGP as a level 1 (L1) node, wherein at least one of the internal nodes has a link to a ToF node and at least one of the internal nodes has a link to a leaf node, the computer implemented method comprising:

a) receiving, by the leaf node, a first link state advertisement indicating that a given destination address or address prefix is reachable via a level 2 (L2) tunnel to a ToF node;
b) storing, on the leaf node, network topology information identifying the L2 tunnel to the ToF node as a non-forwarding adjacency such that the leaf node does not use the non-forwarding adjacency to forward traffic;
c) receiving, by the leaf node, a second link state advertisement indicating that a given destination address or address prefix is reachable via one of the plurality of internal nodes;
d) computing, by the leaf node, routing information for the given destination address or address prefix using address or address prefix information carried in the second link state advertisement; and
e) storing, on the leaf node, the forwarding information.

18. The computer-implemented method of claim 17 further comprising:
f) receiving a packet with a destination address matching, at least in part, the given destination address or address prefix; and
g) forwarding the packet towards the destination address using the forwarding information stored.

19. The computer-implemented method of claim 17 wherein the acta of computing, by the leaf node, routing information for the given destination address or address prefix does not use network topology information carried in the first link state advertisement.

20. The data forwarding device of claim 17 wherein the destination address or address prefix is a destination Internet protocol (IP) address or IP address prefix.

* * * * *